United States Patent [19]

Bauman

[11] 4,026,762
[45] May 31, 1977

[54] USE OF GROUND LIMESTONE AS A FILLER IN PAPER

[75] Inventor: Harry D. Bauman, Glen Rock, Pa.

[73] Assignee: P. H. Glatfelter Co., Spring Grove, Pa.

[22] Filed: May 14, 1975

[21] Appl. No.: 577,340

[52] U.S. Cl. .............................. 162/181 A; 106/306
[51] Int. Cl.² ...................... D21D 3/00; C04B 31/02
[58] Field of Search ................. 162/181 A; 106/306

[56] References Cited
UNITED STATES PATENTS 1,350,694   8/1920   Alton et al. ..................... 106/306

OTHER PUBLICATIONS

Casey "Pulp & Paper," vol. II, (1960) pp. 987 and 988.
Nakata et al., "Studies on Papermaking by use of Surface Sizing Tech.," ABIPC, vol. 42, No. 8, (1972) Abstr. No. 8034.
Huggenberger et al., "Innovations in Coat. Mat'ls. (1) Pig. from Nat. Cal. Carbonate," ABIPC, vol. 44, (1974), Abstr. No. 7203.

Primary Examiner—S. Leon Bashore
Assistant Examiner—Peter Chin
Attorney, Agent, or Firm—Fisher, Christen & Sabol

[57] ABSTRACT

Combinations of fine particle size precipitated $CaCO_3$ and coarser natural ground limestones, up to about 35% ground limestone, have the same opacifying power in paper as does 100% precipitated $CaCO_3$, provided the ground limestone has the proper particle size distribution.

6 Claims, 2 Drawing Figures

USE OF GROUND LIMESTONE AS A FILLER IN PAPER

SUMMARY OF THE INVENTION

This invention relates to the use of ground limestone as a filler in paper. More particularly, it relates to combinations of ground limestone and fine precipitated $CaCO_3$ as fillers in paper, papers filled with such fillers and processes for making such papers.

BACKGROUND OF THE INVENTION

Many types of pigment materials, or fillers, are used in the paper industry to opacify the paper. The most common filler is clay, which has the advantage of being low in cost but the disadvantage of having relatively poor opacifying power. To manufacture papers of high opacity, the industry uses large amounts of anatase $TiO_2$ which has the advantage of having very high opacifying power but the disadvantage of being relatively very expensive.

So long as paper was manufactured under acid conditions because of the need to use alum to obtain sizing with rosin, the paper industry could not use $CaCO_3$ as a filler. Fine particle size precipitated $CaCO_3$ has excellent characteristics as a potential filler for paper. It has about half the opacifying power of $TiO_2$ but at a small fraction of the cost of $TiO_2$. Indeed, with the advent recently of neutral and alkaline sizing materials, those paper mills which have converted to neutral or alkaline paper making have found that by using precipitated $CaCO_3$, the use of $TiO_2$ can be greatly curtailed with resulting significant cost savings.

To accurately describe the present invention, it is necessary to have a quantitative means to express and compare the opacifying power of filler as used in paper. This can be done accurately and precisely by using a measurement called the scattering coefficient, $s$, derived from the theory of light scattering developed by Kubelka and Munk and published in 1931, Z. Tech. Physik 12:539 (1931). Application of the Kubelka-Munk Theory to papers did not come until much after 1931, but is now the common means used by the paper industry to evaluate the opacifying power of fillers. There are a number of excellent discussions of paper applications such as that by W. J. Hillend, Tappi, 49:41A (July 1966) and by G. A. Hemstock, Tappi, 45:158A (February 1962).

Table 1 below gives the scattering coefficients in paper, $s$, for clay, precipitated $CaCO_3$, and the two forms of $TiO_2$. The higher the value of $s$, the greater the opacifying power of the filler. Examination of the scattering coefficients in Table 1 will show that for clay, precipitated $CaCO_3$ and anatase $TiO_2$, these are very close to being in the ratio 1:2:4. It is well recognized that rutile $TiO_2$ has even more opacifying power than anatase, but it is also even more expensive and is used but little in paper.

Table 1 also gives the scattering coefficients in paper for two ground natural limestones, ground limestone A whose average particle size is 3.8u and ground limestone B whose average particle size is 2.0u. As the coefficients show, these have about the same opacifying power as clay. They can be used in place of clay in alkaline papers but they do not give the reduction in $TiO_2$ requirements experienced with precipitated $CaCO_3$. Still there is must interest in the paper industry in using ground natural limestones because these are in wide production while there are only a few producers of precipitated $CaCO_3$, and the natural products are cheaper than the precipitated.

TABLE 1

| | Scattering Coefficients in Paper | |
|---|---|---|
| Filler | s cm²/g | Identification |
| filler clay | 1100 | Klondike, water washed Engelhard Minerals & Chemicals Corporation |
| anatase $TiO_2$ | 4700 | Titanox AWD 1010 NL Industries Inc. or Anatase A-410 New Jersey Zinc Company |
| rutile $TiO_2$ | 5500 | Titanox RA 42 NL Industries Inc. or Rayox R-77 R. T. Vanderbilt Co. |
| ground limestone A | 1200 | 3.8µ average particle size |
| ground limestone B | 1500 | 2.0µ average particle size |
| precipitated $CaCO_3$ | 2300 | Purecal-O, BASF, Wyandotte or Albaglos, Pfizer, Inc. 1.0µ average particle size |

DESCRIPTION OF THE DRAWING

The present invention is described hereinafter and reference is made to the drawings in which.

DETAILED DESCRIPTION OF THE INVENTION

In the present invention, I have found that natural ground limestone, provided that it has a distinctive particle size distribution, when combined with fine particle size precipitated $CaCO_3$ up to a significantly large proportion gives a combination which has the same scattering coefficient in paper as 100% fine particle size precipitated $CaCO_3$. This is an unusual and totally unexpected phenomenon and enables the paper industry to utilize natural ground limestone to excellent advantage.

Figure 1:
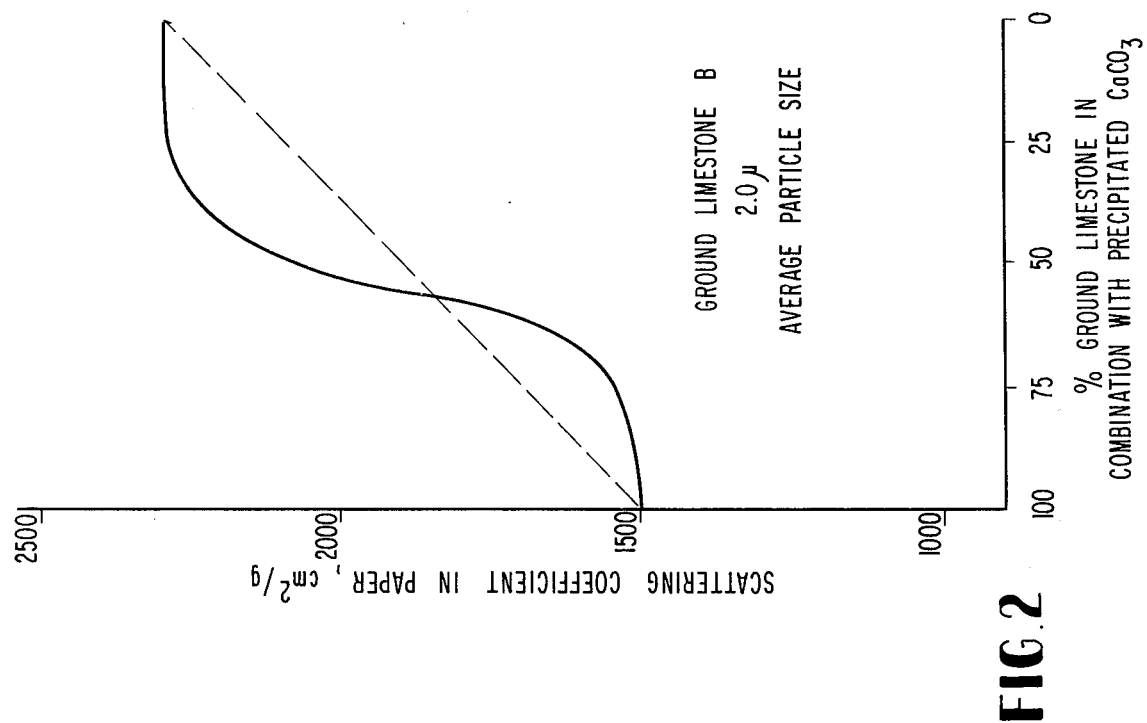
FIG. 1 is a plot of the scattering coefficients in paper of filler combinations containing fine precipitated $CaCO_3$ and ground limestone of 3.8u average particle size versus the percentage of ground limestone in the combination; and, FIG. 2 is a plot (solid curve) of scattering coefficients found in paper for filler combinations containing fine precipitated $CaCO_3$ and ground limestone of 2.0u average particle size versus the percentage of ground limestone in the combination.

With respect to scattering coefficient in paper, ground limestone is an inferior material and fine precipitated $CaCO_3$ is a superior material. When the inferior material is added to the superior material, one would anticipate that the scattering coefficient of the combination would closely reflect the proportions of its components. As shown in FIG. 1, this is exactly what happens when ground limestone A, whose average particle size of 3.8u is outside the scope of this invention, is combined with fine particle size precipitated $CaCO_3$. The empirical scattering coefficients in paper for combinations of ground limestone A and precipitated $CaCO_3$, shown in FIG. 1, agree very closely with the theoretical calculated values. Thus for a 25:75 combination the calculated scattering coefficient is $(0.25 \times 1200) + (0.75 \times 2300) = 2025$, almost exactly the observed value.

Figure 2:
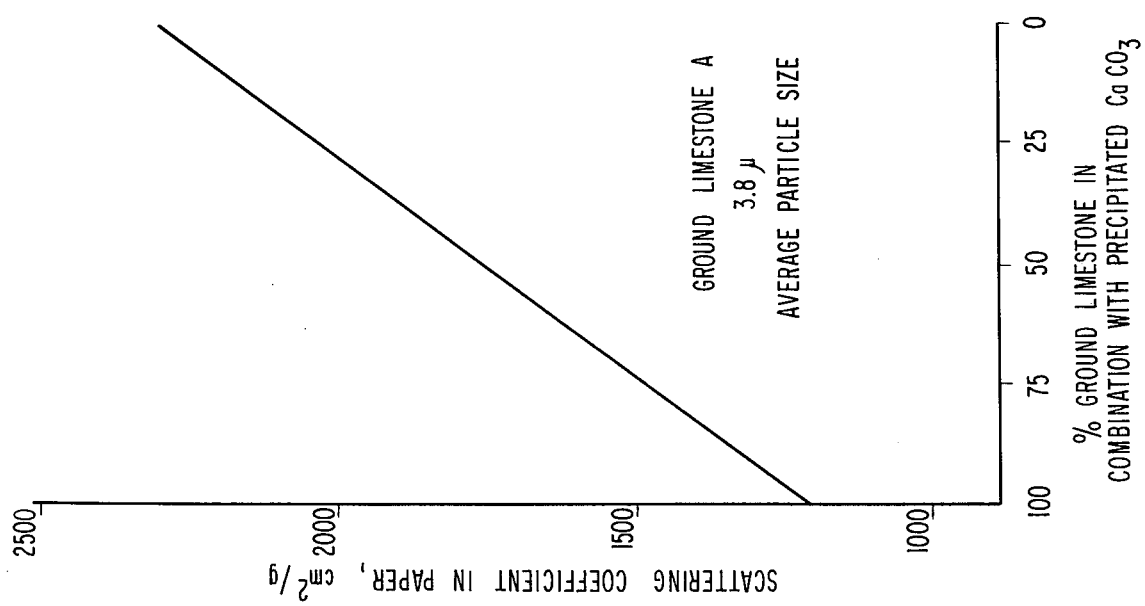
FIG. 2 also shows as a dashed line the expected scattering coefficients based on the percentage of ground limestone used in the filler combinations.

The behavior of combinations of ground limestone B, which has an average particle size of 2.0u, and fine precipitated $CaCO_3$, shown in FIG. 2, is markedly and distinctively different. Here the scattering coefficients in paper for combinations containing up to about 35% ground limestone are essentially the same as the scattering coefficient for 100% precipitated $CaCO_3$. This means that a paper mill which is using fine precipitated $CaCO_3$, as a filler can dilute the relatively scarce and expensive precipitated carbonate by about one-third with the abundant, cheaper natural product without losing any opacifying power. Since a paper mill manufacturing high quality printing papers can easily use 50 to 60 tons of filler per day, potential savings from using ground limestone are large.

With respect to the particle size distribution of a ground limestone necessary to meet the requirements of this invention, essentially all (e.g. 95 or 99 to 100 wt.%), the material must be under 10u equivalent spherical diameter, E.S.D., and the average particle size by weight must be about 2u or less. The ability to form combinations with fine particle size precipitated $CaCO_3$ which retain the same scattering coefficient as the fine precipitated carbonate is quickly lost when the average particle size of the limestone increases above 2u. However, it persists indefinitely below 2u average particle size, down to the finest ground limestone available. As the average particle size of the limestone decreases below 2u, the point at which the scattering coefficents in paper of the combinations start to decrease appreciably, remains essentially constant at about 35% ground limestone in the combination. This means that to realize the advantages of this invention, there is no reason to grind the limestone more finely than the 2u average particle size although smaller sizes can be used.

Average particle sizes for the fine precipitated $CaCO_3$ used herein preferably is about 1u or below. More preferably, it ranges from about 0.1 to about 1u. The size distribution of the fine precipitated $CaCO_3$ is such that essentially all (e.g. at least 95%) the material is under 10u ESD.

Data to illustrate the points just discussed are given in Table 2. The scattering coefficients in paper of the ground limestones themselves, as would be expected are a function of the average particle size. The ground limestones A and B in Table 2 are the same limestones identified in Table 1 and FIGS. 1 and 2. The scattering coefficient in paper of the precipitated $CaCO_2$ was 2300 cm²/g. It should be noted that the measurement of scattering coefficients in paper is a relatively involved procedure, such that differences of less than 100 cm²/g are not considered to be real, statistically significant differences.

TABLE 2

| | Scattering Coefficients in Paper | | | |
|---|---|---|---|---|
| | s Avg. | s values, cm²/g | | |
| Ground Limestone | Part. Size by Wt. ESD | 100% gnd. stone | Combinations* 25:75 35:65 50:50 | | |
| A | 3.8μ | 1200 | 2025 | 1900 | 1750 |
| C | 2.2μ | 1350 | 2080 | 1980 | 1850 |
| B | 2.0μ | 1500 | 2285 | 2230 | 2050 |
| D | 1.7μ | 1690 | 2320 | 2250 | 2030 |
| E | 1.4μ | 1820 | 2290 | 2260 | 2070 |

*the first number is the proportion of ground limestone in the combination

The values of average particle size given herein were determined using the centrifugal sedimentation technique which has been commercialized under the trade name M-S-A Particle Size Analyzer and which is in common use. They agree well with values determined by other sedimentation methods such as the classical Abdreasen Pipet Method or the new Micromeritics Sedigraph method, but will probably differ significantly in numerical value from measurements made by a method based on counting particles, such as the Coulter Counter or use of an electron microscope. However, for any given method for measuring particle size distribution, a relationship similar to that shown in Table 2 will be observed. The values given herein for particle size are by weight and are expressed as equivalent spherical diameter, E.S.D.

With respect to the nature of the ground limestone, it will be recognized by those skilled in the art that its use in paper dictates that the ground product have a good, white color and be low in abrasive materials like silica. I have investigated a large number of such ground limestones and have not found any which, when ground to an average particle size of about 2u or less, did not give the effect claimed in this invention. With respect to the method of grinding, with which this invention is not concerned, it appears that it is immaterial what type of mechanical equipment or mode of production is used to attain an average particle size of about 2u or less. The grinding may be done, for example, in a ball or rod mill, a Raymond Mill, impact cage, or jet mill.

In the preferred embodiment of this invention, the ground limestone and the fine precipitated $CaCO_3$ are combined in slurry form at any convenient solids concentration under mild agitation and added as this slurry to the paper furnish. However, the ground limestone and precipitated $CaCO_3$ may be added to the paper machine system separately, either simultaneously or successively, without obviating the beneficial effects of this invention.

EXAMPLES

Two examples are given to show that in paper, combinations of up to about 35% ground limestone and fine precipitated $CaCO_3$ have essentially the same scattering coefficient and opacifying power in paper as 100% precipitated $CaCO_3$. Data on basis weight, opacity, brightness and % filler in the paper are given in Tables 3 and 4. From these data, using a Judd chart, the scattering coefficients, s, were determined.

The first example is based on handsheets made under carefully controlled conditions, according to TAPPI Standard Method T205 os 71, which may be considered as ideal for fillers to exhibit their true scattering potential. The second example is based on paper made on a paper machine where conditions are normally less than ideal and where the full scattering potential of filler is rarely realized. Therefore, in the second example, the scattering coefficients of the fillers are generally lower than in the handsheets.

EXAMPLE 1

Precipitated $CaCO_3$ - Albaglos (Pfizer Inc.) of average particle size of 1u.

Average particle size of ground limestone - 1.8u.

Scattering coefficient of the pulp - 300 cm²/g.

A paper furnish was prepared containing 70 wt.% fully bleached hardwood pulp, 30 wt.% fully bleached pine pulp and cationic starch retention aid in the amount of about 8 lb. per ton. The furnish was refined to a Canadian standard freeness of 400. The ground limestone and Albaglos were combined in slurry form at 20% solids to give 25:75 and 35:65 combinations. The slurry was then added to the paper furnish. Calcium carbonate was the only filler in the paper.

The data are given in Table 3. Both B & L (Bausch and Lomb) and GE brightness are given. B & L brightness was used to determine the scattering coefficients. GE brightness at 457 nm is commonly used to express paper brightness. The opacity values of the handsheets have all been corrected to 65 g/m² basis weight.

TABLE 3

EXAMPLE 1
Handsheet Data

| Type of Filler | Opacity | Brightness B & L | Brightness GE | % CaCO₃ in paper | Paper s cm²/g | Filler s cm²/g |
|---|---|---|---|---|---|---|
| 100% prec. CaCO₃ | 89.5 | 89.5 | 87.0 | 19.0 | 665 | 2300 |
| Gnd. Limestone:prec. CaCO₃ 25:75 | 89.5 | 89.0 | 85.8 | 18.1 | 660 | 2340 |
| Gnd. Limestone:prec. CaCO₃ 35:65 | 89.0 | 88.5 | 85.7 | 17.5 | 635 | 2270 |

EXAMPLE 2

Paper Machine Data

Precipitated CaCO₃ - Purecal-O (BASF Wyandotte Corp.) having an average particle size of 1u.

Average particle size of ground limestone 2.0u.

Scattering coefficient of the pulp — 375 cm²/g.

A paper furnish was prepared containing 60 wt.% fully leached hardwood pulp, 40 wt.% fully bleached pine pulp and a high molecular weight cationic polymer retention aid in the amount of 0.5 lb. per ton. The furnish was refined to a Canadian standard freeness of 400. The ground limestone and Purecal-Owere combined in slurry form at 20% solids to give 25:75 and 35:65 combinations and added to the paper furnish. Calcium carbonate was the only filler in the paper.

The measured data are given in Table 4.

About 35% ground limestone having an average particle size of about 2u or less in a combination with fine particle size precipitated CaCO₃ is the upper level at which such combinations have essentially the same scattering coefficient in paper as 100% fine precipitated carbonate. Lesser advantage is realized by using up to about 50% ground limestone in such combinations as shown in FIG. 2. Use of more than about 35% ground limestone in combination with fine precipitated CaCO₃ to take advantage of the synergistic effect observed in this invention should not be considered to fall outside the limits of this invention.

TABLE 4

Example 2
Paper Machine Data

| Type of Filler | Basis Wt. g/m² | Opacity | Brightness B & L | Brightness GE | % CaCO₃ in paper | Paper s cm²/g | Filler s cm²/g |
|---|---|---|---|---|---|---|---|
| 100% prec. CaCO₃ | 70 | 92.5 | 81.5 | 80.6 | 16.7 | 630 | 1760 |
| Gnd. Limestone:prec. CaCO₃ 25:75 | 70 | 92.5 | 81.5 | 81.5 | 16.3 | 635 | 1760 |
| Gnd. Limestone:prec. CaCO₃ 35:65 | 70 | 91.0 | 80.5 | 80.1 | 14.1 | 565 | 1710 |

What is claimed is:

1. A mixed filler material for addition to paper furnish to provide substantially the same scattering coefficient in paper as 100% precipitated calcium carbonate comprising aboout 5 to about 35 wt.% ground limestone particles having an average particle diameter by weight determined by centrifugal sedimentation of 2 microns or less, at least 95 wt.% of said ground limestone particle having an equivalent spherical diameter of 10 microns or less, and about 95 to 65 wt.% precipitated calcium carbonate particles having an average particle diameter of less than 1 micron.

2. Mixed filler material as claimed in claim 1 wherein the amount of ground limestone is about 10 to about 25 wt.% and the amount of precipitated calcium carbonate is about 90 to about 75 wt.%.

3. Paper containing as filler the mixed filler material claimed in claim 1.

4. Paper containing as filler the mixed filler material claimed in claim 2.

5. Process of producing filled paper comprising the steps of preparing a paper furnish, adding to said paper furnish the mixed filler material claimed in claim 1 and sheeting the furnish to form said paper.

6. Process of producing filled paper comprising the steps of preparing a paper furnish, adding to said paper furnish the mixed filler material claimed in claim 2 and sheeting the furnish to from said paper.

* * * * *